(12) United States Patent
Leonardi et al.

(10) Patent No.: US 8,757,489 B2
(45) Date of Patent: Jun. 24, 2014

(54) PORTABLE DEVICE AND METHOD FOR READING CODED INFORMATION

(75) Inventors: Andrea Leonardi, Calderara di Reno (IT); Giovanni Giordano, San Giovanni in Persiceto (IT)

(73) Assignee: Datalogic IP Tech S.r.l., Lippo di Calderara di Reno (Bologna) (IT)

( * ) Notice: Subject to any disclaimer, the term of this patent is extended or adjusted under 35 U.S.C. 154(b) by 11 days.

(21) Appl. No.: 13/519,182

(22) PCT Filed: Dec. 20, 2010

(86) PCT No.: PCT/IB2010/055944
§ 371 (c)(1),
(2), (4) Date: Jun. 26, 2012

(87) PCT Pub. No.: WO2011/080658
PCT Pub. Date: Jul. 7, 2011

(65) Prior Publication Data
US 2012/0286043 A1      Nov. 15, 2012

(30) Foreign Application Priority Data
Dec. 29, 2009   (IT) ............................. MO2009A0317

(51) Int. Cl.
*G06K 7/00* (2006.01)
(52) U.S. Cl.
USPC .................. 235/440; 235/462.3; 235/462.44; 235/472.01
(58) Field of Classification Search
USPC ............. 235/462.44, 462.45, 462.46, 462.13, 235/462.3, 472.01, 472.02, 472.03, 440
See application file for complete search history.

(56) References Cited

U.S. PATENT DOCUMENTS 6,318,636 B1   11/2001   Reynolds et al.
2005/0269411 A1   12/2005   Vesikivi et al.

FOREIGN PATENT DOCUMENTS

EP   1 128 315 A1   8/2001
EP   1 816 585 A1   8/2007

OTHER PUBLICATIONS

International Search Report and Written Opinion dated May 12, 2011 in corresponding International Application No. PCT/IB2010/055944.

*Primary Examiner* — Karl D Frech
(74) *Attorney, Agent, or Firm* — Duane Morris LLP

(57) ABSTRACT

A portable device includes coded information reading means, digital image acquisition means and an illuminator, associated with the acquisition means for acquiring images. The illuminator is powerable by a driving signal which corresponds to a first current signal in a first operating mode for illuminating an image to be acquired and is powerable by the driving signal which corresponds to a second current signal in a second operating mode for emitting a visual indication indicating the outcome of the reading of the coded information, read by coded information reading means. The illuminator, which acts as a flash to acquire an image in the first operating mode, thus also acts as a visual indication of the reading outcome in the second operating mode and illuminates with a continuous or intermittent light the space in front of the illuminator to indicate to an operator that the coded information has been read.

25 Claims, 3 Drawing Sheets

PORTABLE DEVICE AND METHOD FOR READING CODED INFORMATION

BACKGROUND AND SUMMARY OF THE INVENTION

The invention relates to a portable device and a method for reading coded information and digital images.

The term "coded information" indicates an "optical code", i.e. a set of graphic marks, placed on a label or directly on a product by means of which a piece of information is coded as a sequence of white zones and black zones or of variously coloured zones arranged according to two or more directions. Examples of such codes are barcodes, stacked codes, two-dimensional codes, colour codes and other codes. Portable devices are known that are provided with coded information reading means that perform reading using different technologies, which are mainly based on scanning luminous radiation. Such means for reading coded information can be, for example, based on laser but also on digital image acquisition means, the term "digital image" meaning an image that can be acquired by a sensor, consisting of pixels, which can be linear or matrix. Typically, such reading means is arranged on a head face of the portable device and the operator acquires the optical code to be decoded, according to a first operating mode of the portable device, arranging this head face facing the coded information.

Some applications of the portable device nevertheless not only require the coded information to be read but also require an operation performed by an operator to be documented visually. For example, increasingly frequently, acquiring the signature of a document is required as proof of handing-over of a delivery. For this reason, increasingly frequently, the portable device also comprises digital image acquisition means, such as, for example, a conventional digital camera, which offers a colour image of the framed zone, has a very great number of sensor pixels, but which is not normally arranged for reading an optical code in the sense that it acquires images that are difficult to decode.

The portable device further comprises also a graphic display, for displaying text and/or graphic information in which the image is displayed that is acquired by the digital image acquisition means, whether the image can be an optical code or a visual document. The portable device further comprises also data inserting means, for example a keyboard, which in some applications may also not be present inasmuch as the data can also be inserted via the display screen itself, if it is a touchscreen. The display and the keyboard, if present, are typically arranged on a larger front face of the portable device whilst the digital camera is arranged on a larger rear face, opposite the front face, of the portable device in such a manner that the operator, according to a further operating mode of the portable device, framing the image of interest with the camera facing downwards, can see displayed on the display the result of the acquisition.

"Coded information" is further to be intended as indicating any information or set of information that is coded and stored in a transponder, which is generally part of a "tag" or of a label, which is read and/or written in a known manner by the radio-frequency reading and/or writing means, better known as RFID reading means. The portable device thus also comprises reading means for reading radio-frequency coded information, which, in particular, comprises a generator of an interrogation radio signal and an antenna for transmitting and/or receiving the radio signal. The radio-frequency antenna can be arranged on any portion of the portable device, provided it faces outwards, and thus an operator, to read coded information in an RFID tag according to a further operating mode, faces the portion of the device containing the antenna facing the RFID tag.

The portable device further comprises at least one reading outcome indicator that makes the outcome of a reading operation perceptible to the user, whether it can be a reading of coded information or an image acquisition. This indicator can be, for example, a sound indicator, a vibration indicator or a visual indicator. The visual indicators certainly constitute more effective reading outcome indicators, also in noisy industrial environments where acoustic and vibration indicators are used less effectively, and they are further cheap and very compact. Nevertheless, the position in which the visual indication is shown is of fundamental importance, inasmuch as it is necessary that it be always within the field of view of the operator.

Visual reading outcome indicators are known that emit a beam of light the emission angle of which covers a region of space that approximately identifies the field of view of the operator. One example of a visual indicator of this type, typically used when the portable device is used according to the first operating mode, is known from EP1128315 A1, which shows a light beam projected towards the plane in which the coded information is located. One problem of the visual indicator disclosed by EP1128315 is that, during operation of the portable device, as the portable device can be grasped by an operator in different configurations in function of various acquisition needs, some use configurations of the portable device are possible in which the visual indication is not visible to the operator.

In order to overcome this problem, it is known from EP1816585 A1 to provide the portable device with two visual indicators arranged in positions that are such that each emission angle covers a respective field of view, which are oriented differently from one another in space to ensure increased visibility for an operator.

Nevertheless, the more the portable device is able to read different types of "coded information", or to acquire digital images in different positions, the more the use configuration of the portable device increase so that some configurations of use of the portable device exist in which neither of the two visual indicators disclosed by EP1816585 A1 is visible to the operator.

It follows that it would be necessary to provide the portable device with a plurality of visual indicators, in various zones of the portable device, such that at least one of the visual indicators covers a respective effective field of view of an operator. A solution of this type not only requires a multiplication of the indicator devices, with a consequent increase in costs, but also imposes that the portable device has to be modified over time, if a further possible operating mode with the same portable device is identified with which a corresponding visual indication is not associated.

It should be noted that, usually, the display also acts as a visual indicator, for example during the image-acquisition operating mode, but the use of the display is further limited by the fact that a cheap liquid crystal display is typically readable only when the operator is positioned in front of the display or within a limited angle.

One object of the present invention is to make a visual reading outcome indication available that does not require additional visual indicators.

A further object of the present invention is to associate a further visual indicator with the coded information reading means, in particular associating a visual indicator with the coded information radio-frequency reading means.

According to the invention, a portable device is provided, and a method for reading coded information and image acquisition.

According to the invention, an illuminator is provided, associated with image acquisition means that is able to emit a visual reading outcome indication at an operating mode of use of the portable device in which the device reads coded information. In this manner, the illuminator, acting to illuminate an image framed during an image-acquisition operating mode inasmuch as it is powerable by a driving signal which corresponds to a first current signal, also supplies a visual reading outcome indication inasmuch as it is powerable to a second current signal at a further operating mode of reading coded information. In this manner, it is not necessary to provide the portable device with further visual indicators inasmuch as the illuminator also supplies the reading outcome visual indicator.

Further, as the illuminator illuminates a semispace in front of the illuminator, a non-directive visual indicator is obtained that is able to be used advantageously also in existing applications and in possible future applications. In particular, as the coded information radio-frequency reading means is arranged in a first face of the portable device, for example a front face or an upper head face, whilst the image acquisition means and the illuminator are arranged in a second face del device, for example a rear face, opposite or adjacent to the first but above all different from the first face, the visual reading outcome indication is perceived visually in all the semispace in which the operator is positioned, which corresponds to the semispace on which the illuminator is, when a reading of radio-frequency coded information is obtained.

In this manner, the first semispace from which the reading means is able to read coded information, is oriented diversely in space with respect to the second semispace, in which the visual reading outcome indication is provided.

In fact, as the radio-frequency antenna has to be arranged facing the RFID tag to read an RFID tag, it is advantageous to have a visual reading outcome indication in the semispace in front of the rear face of the portable device, facing the operator or anyway clearly visible to the operator.

BRIEF DESCRIPTION OF THE DRAWINGS

The invention can be understood better and implemented with reference to the attached drawings that illustrate embodiments thereof by way of non-limiting example, in which.

DETAILED DESCRIPTION

Figure 1:
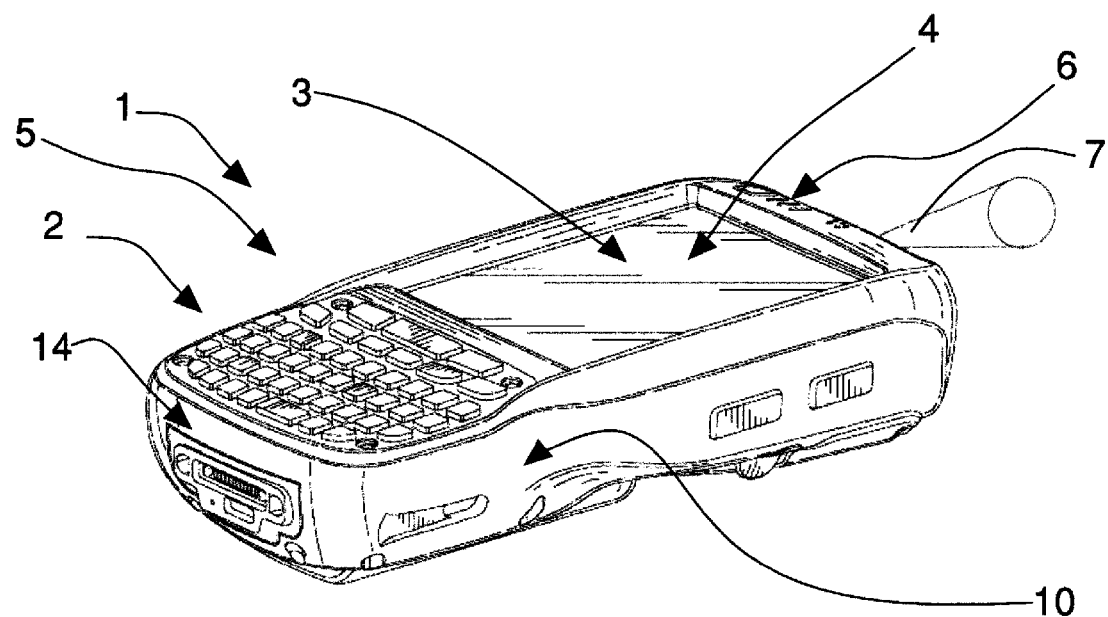
FIG. 1 shows a perspective view of a portable device according to the invention, in a first operating mode for reading coded information to which a first visual reading indicator corresponds.

FIG. 1 shows a portable device 1, also known as a PDT (portable data terminal), for the automatic or manual acquisition of coded information such as an optical code and further, or alternatively, a code stored in a transponder (also known as a Radio Frequency Identification Device or "RFID tag") and for the acquisition of digital images.

Figure 2:
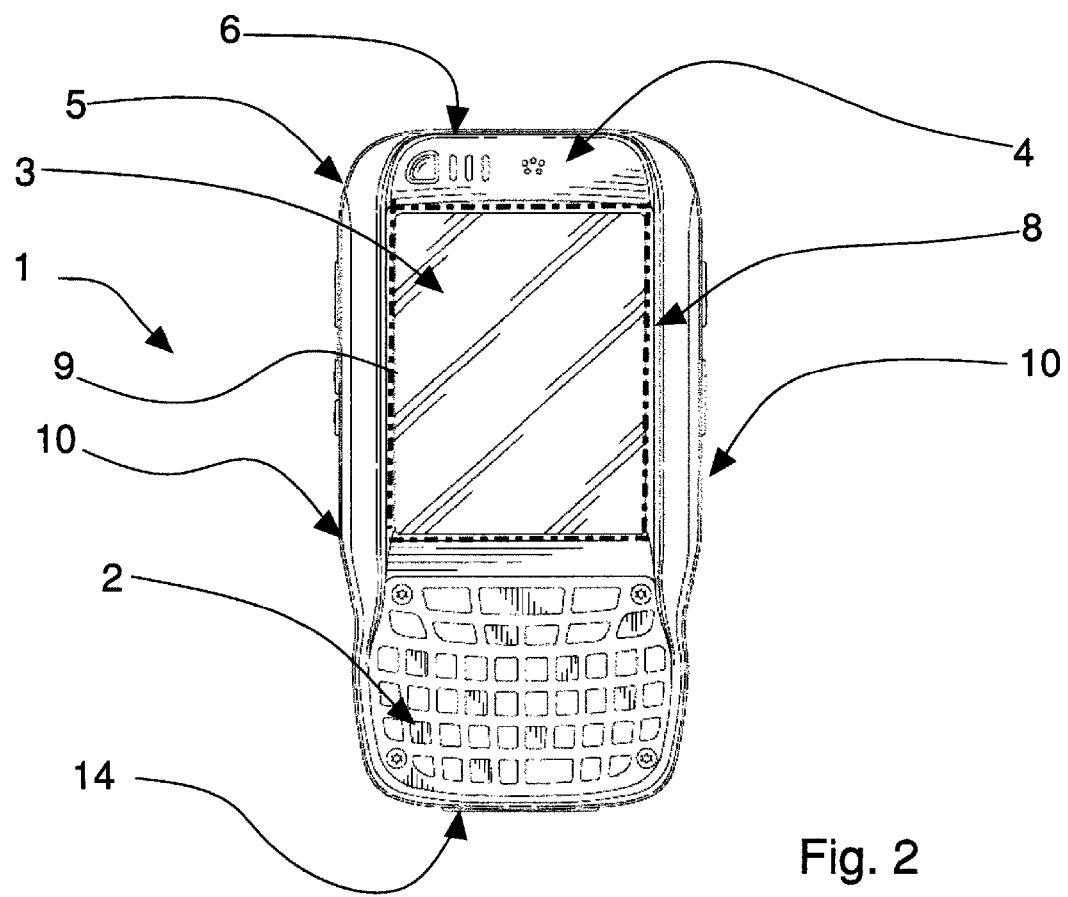
FIG. 2 shows a front view of the portable device according to the invention, in which a radio-frequency antenna for reading radio-frequency coded information is visible.

As illustrated in FIGS. 1 and 2, the portable device 1, or PDT, comprises a keyboard 2 and display means 3, that may include, for example, an LCD (Liquid Crystal Display) arranged on a front face 4 of the portable device 1 and coded information reading means 5 (FIG. 4) that comprises optical code reading means (that is not illustrated) that is of known type, arranged on an upper head face 6 of the portable device 1. On this upper head face 6 a first visual reading outcome indicator of known type is also arranged, which projects onto the plane containing the optical code, or tangent at the surface containing the optical code, a beam of light 7 that defines a desired luminous figure, in this case a cone of light. The portable device 1 is thus able to read coded information, for example an optical code, arranged in a semispace in front of the upper head face 6.

As illustrated in FIG. 2, the coded information reading means 5 further comprises radio-frequency reading means 8, which comprises an antenna 9 for transmitting and/or receiving a radio-frequency signal from an RFID tag. The antenna 9, represented by a dashed line in FIG. 2, is arranged on the front face 4 of the portable device 1, in particular along the entire perimeter of the display 3 and is thus able to read radio-frequency coded information arranged in a semispace in front of the front face 4.

The antenna 9 is typically made by means of a layer of transparent conductive material arranged along the perimeter of the display (indium tin oxide—ITO conductive transparent substrate) or by means of the placing of a conductive non-transparent strip onto a portion of the perimeter of the display 3. In this manner, an effective antenna 9 is made without dedicating a specific portion of the external casing of the portable device 1 to the antenna and reducing the overall dimensions due to the antenna itself.

It should be noted that, without limiting the scope of the invention, the antenna 9 can also be arranged along at least one portion of the perimeter of the display 9 or on a face of the non-frontal portable device 1, such as, for example on one of the two side faces 10.

Alternatively, the antenna can also be arranged on the upper head face 6 or a lower head face 14, for example at least along a portion of the perimeter of the frame comprising the optical code reading means (that is not illustrated). In other words, considering the external casing of the portable device 1, having at least two main openings, i.e. a first opening on the front face 4 for the display 3 and a second opening on the upper head face 6 that constitutes the frame of the reading means of the optical code, the antenna 9 can be advantageously inserted at at least one portion of the perimeter of the first or of the second opening.

Figure 3:
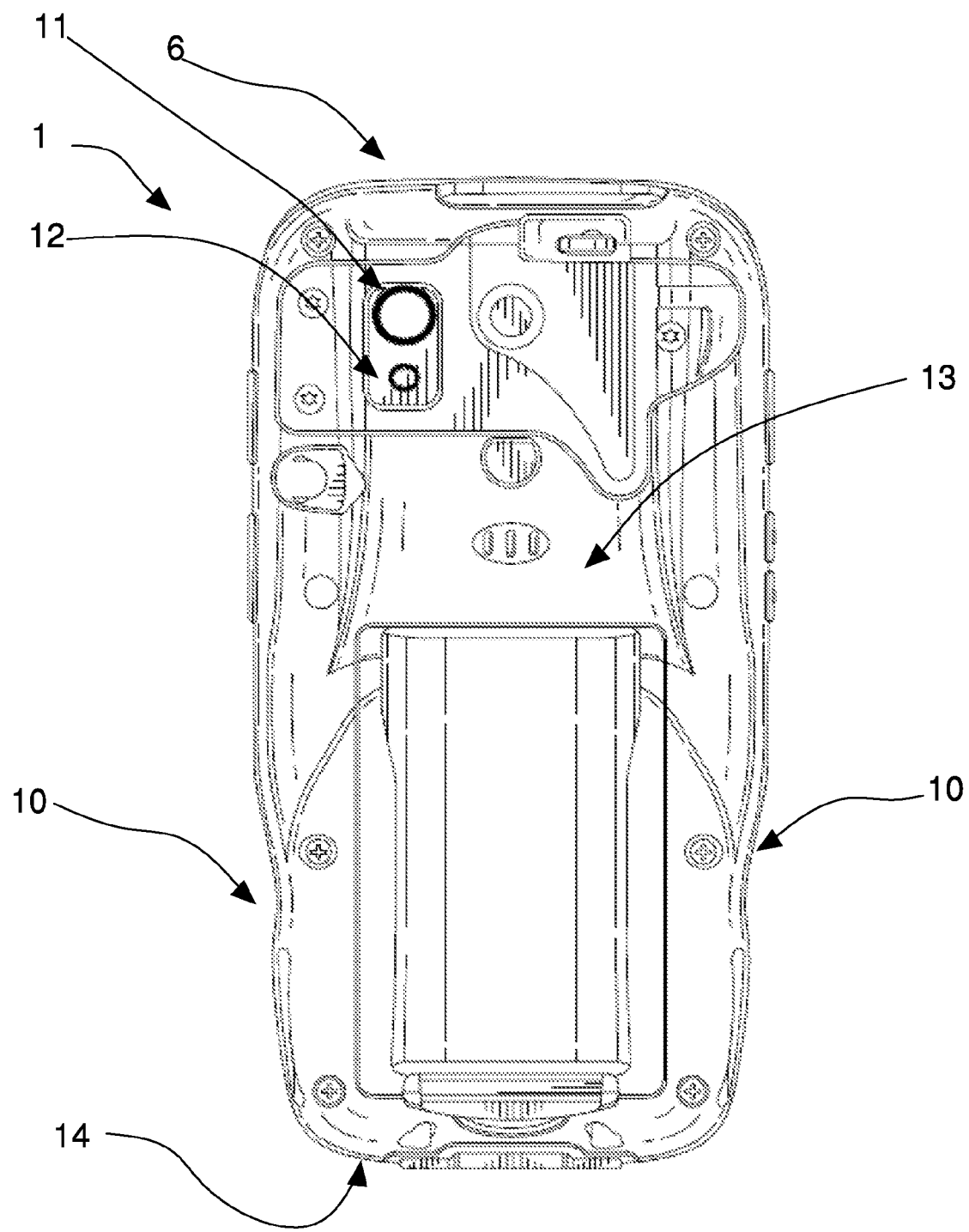
FIG. 3 shows a rear view of the portable device according to the invention in which an image acquisition camera and an illuminator associated with the camera are visible.

As illustrated in FIG. 3, the portable device 1 further comprises image acquisition means 11, for example a commercial digital camera, and an illuminator 12, associated with the camera. The image acquisition means 11 and the illuminator are arranged on a rear face 13 of the portable device 1, opposite the front face 4, and the illuminator 12 illuminates a portion of a semispace in front of the rear face 13, opposite the semispace in front of the front face 4, during image acquisition.

The upper head face 6, the lower head face 14 and the two side faces 10 connect the front face 4 to the rear face 13 and are adjacent to both the front face 4 and to the rear face 13.

The portable device 1 thus comprises reading means 5, that is able to read optical and/or radio-frequency coded information, arranged at least partially on a first face of the portable device 1, which may be the front face 4 and/or the upper head face 6 and/or one of the side faces 10, to read coded information arranged in a first semispace in front of the first face. The illuminator 12 is arranged in a second face, in the rear face 13, which is different from the first face in which the reading means 5 is arranged, for illuminating a second semispace in front of the second face and making a visual reading outcome indication available in the second semispace.

In this manner the first semispace, on which the coded information is arranged, is thus oriented differently in space with respect to the second semispace, in which the visual reading outcome indication is provided.

Figure 4:
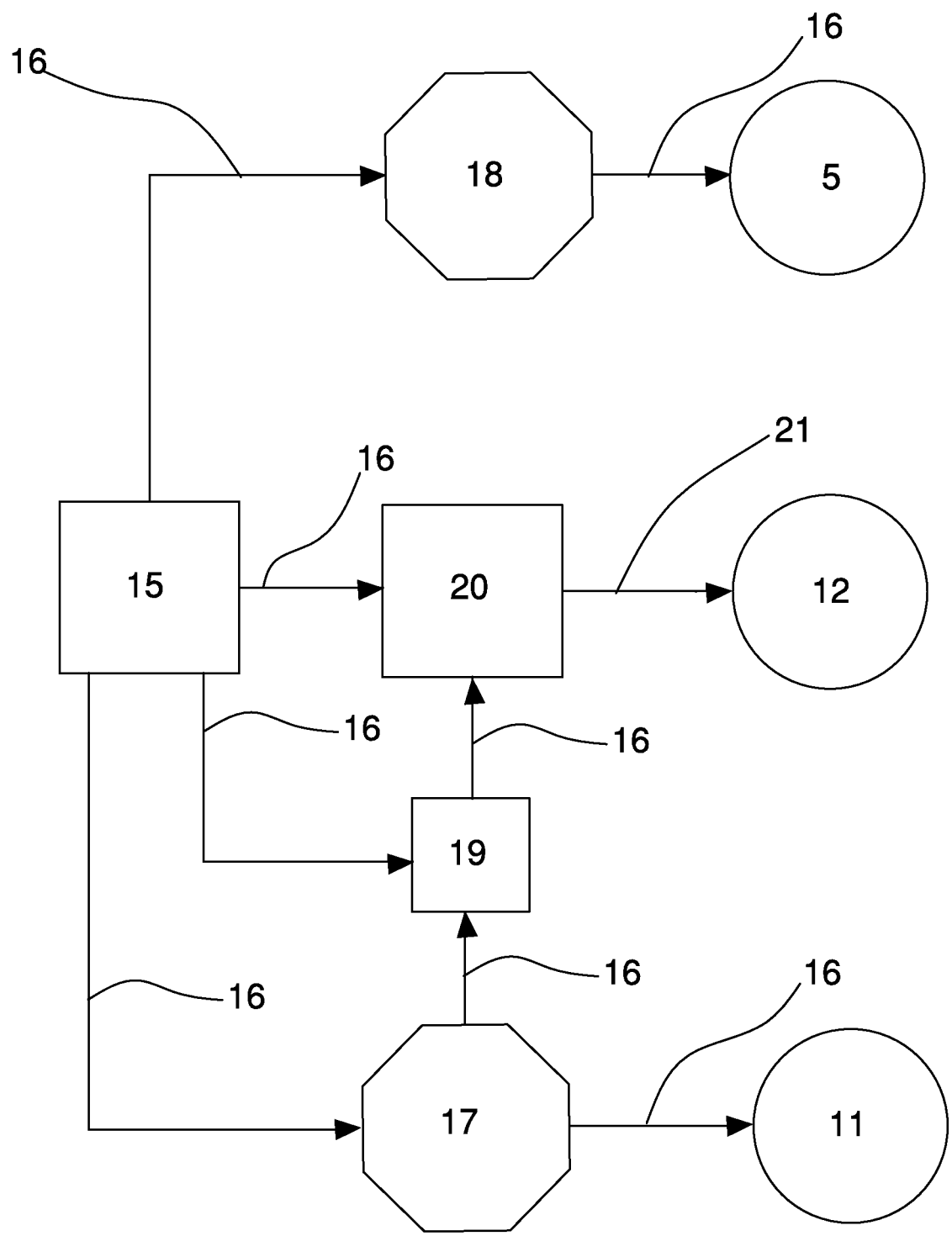
FIG. 4 is a block diagram of the control system of the portable device, according to the invention.

The portable device 1 further comprises, as illustrated in FIG. 4, a control system comprising a main controller or host 15 connected, by connecting and data-exchange means 16, to first managing means 17 of the camera 11, to second managing means 18 of the coded information reading means 5, to third managing means 19 of illumination enabling and to driving means 20 of the illuminator 12.

The connecting and data exchange means 16, achieved by standard data exchange techniques for integrated electronic devices, constitutes the means through which the main controller 15 sends data and/or commands to the first managing means 17 of the camera 11, and to the second managing means 18 for managing coded information reading means 5, in addition to the third managing means 19 of illumination enabling. Further, as they are all integrated electronic devices, the connecting and data exchange means 16 also constitute the means through which the first managing means 17 of the camera 11 sends data and commands to the camera 11 itself and the second means 18 for managing coded information reading means sends data and commands to the optical code reading means and further, or alternatively, to the coded information radio-frequency reading means 8.

It should be noted that the third means 19 for managing illumination enabling sends an enabling signal to the driving means 20 of the illuminator 12 and substantially acts as a logic "OR" between an enabling command coming from the main controller 15 and a command coming from the first managing means 17 of the camera 11, as will be explained below.

On the other hand, the driving means 20 sends the illuminator 12 a current driving signal 21 that determines, at the input of the illuminator 12, the operation mode of the illuminator 12.

The simplest and cheapest illuminator 12 consists of a single microcircuit, in particular a single LED, powerable by a driving signal 21 that comprises a single current line. In particular, the microcircuit is powerable by a driving signal 21 which corresponds to a first current level of the current line in a first operating mode, to a second current level in a second operating mode and to a third current level in a third operating mode.

In this case, the illuminator 12 illuminates with a different light according to the level of current with which it is powered and the higher the current level the more intense the illumination at the various operating modes of the illuminator 12.

At a first image-acquisition operating mode, supplying the illuminator 12 with a single current pulse at a first current level, for example a value pulse equal to 800 mA and with a duration equal to a value comprised between 100 ms and 800 ms, optimum illumination of the second semispace is obtained during image acquisition. The illuminator acts definitively as the flash of a camera during an image acquisition.

At a second operating mode for reading coded information, powering the illuminator 12 with a driving signal 21 which corresponds to a continuous signal, or alternating signal or sinusoidal signal or square-wave signal with duty cycle below 50% or with a series of pulses, the (constant or peak) value of which at a second current level is equal to a value of 20 mA and the duration of which can, for example, be of a few seconds but can also be of fractions of seconds, continuous or intermittent illumination is obtained that is used, as will be shown below, as a visual reading outcome indication.

At a third operating mode for illuminating a semispace in front of the illuminator 12, like the second semispace, by lastly powering the illuminator 12 with a driving signal 21 which corresponds to a continuous signal at a third current level, for example a continuous signal the value of which is equal to 350 mA, an illumination of the second semispace is obtained that is for example usable for illuminating the image to be acquired and setting in the camera a plurality of parameters to be used in a subsequent acquisition of the image. Alternatively, the illumination of the second semispace can be used as a real light source at the request of the operator in conditions of poor visibility. The illuminator in practice acts at the service of a subsequent image acquisition, or as a torch, if commanded by an operator.

Thus, in order to obtain maximum illumination, the illuminator 12 is powerable at a first current level, which is greater than the second and the third current level, whilst, to obtain a visual reading outcome indication facing an operator, the illuminator is powerable to a second current level, which is less than the first and the third current level.

Although there is little illumination at the second current level, it should be noted that the effect of the visual indication is obtained anyway in typical operating conditions inasmuch as 20 mA corresponds to the normal current level required for an indication LED that does not dazzle the user; this effect is obtained even more in the case of an intermittent driving signal 21, the human eye being even more sensitive to a light source if it is a low-frequency intermittent light source.

According to an alternative embodiment, the illuminator 12 comprises at least two microcircuits for emitting light of different colours, i.e. comprises a multi-chip LED light source, with different emission bands that can be lit independently. For example, a RGB illuminator 12 can be used with three-chips that emit in the three basic colours (red, green and blue) that are drivable independently to obtain the entire range of colours that are perceivable to the human eye. In this case, the illuminator is powerable by a driving signal 21 comprising three current lines, each for a respective microcircuit. Each current line is powered to a respective first current level, second current level and third current level by which it is possible to arrange the illuminator for emitting light of a first colour at a first operating mode and of a second colour at a second operating mode.

In general therefore, the illuminator is powerable by a driving signal 21 which corresponds to a first current signal in the first operating mode, to a second current signal in the second operating mode and to a third current signal in the third operating mode.

If the illuminator comprises a single microcircuit for emitting light of a single colour, the driving means 20 of the illuminator 12 controls a current driving signal 21 that is a single current line and therefore, as explained previously, the first, the second and the third current signals correspond to respective current levels the value of which and the continuous or alternating wave shape of which determine the impact of the lighting.

If, on the other hand, the illuminator comprises at least two microcircuits for emitting light of different colours, each microcircuit is powerable with a respective current line of the current signal and the driving means 20 thus command a more complex driving signal 21. The driving signal 21 can, for example, be formed of as many different current lines as the microcircuits but also, for a more advanced multichip illuminator 12 the chips of which are not powerable independently but by managing means integrated into the illuminator 12, by a data line for connecting to the illuminator 12 and coding the driving signal 21.

In use, the main controller 15 receives the commands from an operator that uses the portable device 1 both for reading coded information and for image acquisition.

In a first image-acquisition operating mode, the operator directs the rear face 13 of the portable device 1 to the image and commands, via the keyboard 2, the acquisition. In this case, the main controller 15 sends to the first managing means 17 of the camera 11 an acquisition command and commands the driving means 20 to provide the illuminator 12 with a suitable driving signal 21.

Without limiting the scope of the invention but only for the sake of simplicity, it will be hypothesised from henceforth that the illuminator comprises a single microcircuit i.e. that it is a single LED.

In the first image-acquisition operating mode the driving signal 21 it is a current line powered with a signal which corresponds to a first current level at a maximum level, to run the illuminator 12 in "flash" mode.

In particular, the first managing means 17 of the camera 11 commands the third managing means 19 enabling the driving means 20, which, after it has been enabled, powers the illuminator 12 with the current line powered with a signal which corresponds to a current pulse equal to 800 mA per 500 msec. In the interval in which the illuminator is active, the camera 11 acquires the image of interest, which is shown to the operator on the display 3, which also provides the visual reading outcome indication in the first semispace identified by the display itself.

It should be noted that, if from settings prior to the actual acquisition, as will be disclosed below, the flash was not necessary for an image acquisition, the first managing means 17 of the camera 11 does not command the third managing means 19 of enabling to enable the driving means 20 and the illuminator emits no light, the flash does not operate, and image acquisition occurs through natural light.

In a second operating mode for reading coded information, the code to be read can be, for example, an optical code. The operator directs the upper head face 6 of the portable device 1 to the code and commands, via the keyboard 2, the acquisition. The main controller 15 communicates to the second managing means 18 of the coded information reading means 5 to acquire and decode the optical code and to emit the beam of light 7, upon completion of decoding, to project into the plane containing the optical code a visual, for example green, indication indicating that reading and decoding have been completed. The controller 15 further commands the third managing means 19 of the enabling to enable the driving means 20 and simultaneously commands the driving means 20 to power the illuminator 12 by the driving signal 21 which corresponds to a second current signal. The illuminator 12 is thus powered by the driving signal 21 that consists of a current line powered with a signal which corresponds to a continuous or alternating signal, the peak value of which is equal to 20 mA, to emit a visual indication that reading and decoding have been completed.

It should be noted that the visual indication of completed reading, if the portable device 1 is grasped with the display 3 towards the operator, is directed downwards, i.e. towards the semispace in front of the rear face 13 of the portable device 1, which would otherwise be a zone without any visual indication.

In this case, the first face in which the coded information reading means 5 is located is the head face 6 and is illuminated at least one portion of the semispace in front of the second face, which is the rear face 13, which is adjacent to the first face.

The visual indication of completed reading, in which the second semispace is illuminated uniformly, is particularly useful when the optical code to be read is positioned in zones that are difficult to access and therefore also the beam of light 7, upon completion of decoding, is projected into zones that are not very visible. For example, the operator may be forced to lift the portable device above his head to direct the head face 6 of the portable device 1 towards an optical code positioned in a high position. Whilst the beam of light 7 projected upwards could be hardly visible to the operator, the visual indicator obtained by the illuminator 12 ensures on the other hand high visibility, providing uniform illumination in the semispace in front of the rear face 13. It should be noted that this is true regardless of how the operator grasps the portable device 1, inasmuch as the visual indication has high visibility even if the illumination faces upwards and not towards the operator, when the portable device 1 is grasped with the front face 4 thereof facing downwards.

According to the second operating mode for reading coded information, the code to be read, can, for example, be a radio-frequency code. The operator directs the front face 4 of the portable device 1 comprising the coded information radio-frequency reading means 8 downwards such as to arrange the antenna 9 facing the RFID tag of a product and commands, via the keyboard, 2, the acquisition. The main controller 15 communicates to the second managing means 18 of the coded information reading means 5 to acquire and decode the radio-frequency code, further commands the third managing means 19 of the enabling to enable the driving means 20 and simultaneously commands the driving means 20 to power the illuminator 12 by a driving signal 21 which corresponds to the second current signal. The illuminator 12 is thus powered by the driving signal 21, which consists of the current line at the second direct or alternating current level, the peak value of which is equal to 20 mA to emit a visual indication of completed reading and decoding.

In this case, the visual indication of completed reading achieved by the illuminator 12 sends an immediate and direct visual indication to the operator who is grasping the portable device with the display 3 facing downwards and thus sees the rear face 13 of the portable device 1.

The first face in which the coded information reading means 5 is located, in particular a radio-frequency coded information reading means 5, is the front face 4 and radio-frequency coded information is acquired in the first semispace, in front of the front face 4. At least one portion of the semispace in front of the second face is illuminated, and the second face is the rear face 13 opposite the first face and in this case the first semispace is opposite second semispace.

In practice, the coded information reading means 5, in particular radio-frequency coded information reading means 5, is arranged on the first face, which is the front face 4 of the device and reads coded information arranged in the first semispace, in front of the front face 4. The illuminator 12 is on the other hand arranged on the second face, which is the rear face 13, which is opposite the first face, and thus illuminates at least one portion of the second semispace opposite the first semispace.

A visual indication of the read information is thus obtained without increasing the number of visual indicators but using the illuminator.

Again, it should be noted that the visual indicator obtained by the illuminator 12 is not directed in a single direction like the cone of light 7 emitted by the head face 6 but is visible in the semispace in front of the rear face 13 and can therefore be used in many applications, also when, for example, conditions of poor visibility make the screen 3 of the portable device 1 unusable.

We said previously that the radio-frequency coded information reading means 5 can also be arranged on a non-frontal face of the portable device 1, such as, for example on one of the two side faces 10 or on the upper head face 6. Also in this case, at least one portion of the semispace in front of the rear face 13 of the device 1 is illuminated, wherein the rear face 13 is different from the face in which the coded information reading means 5 is arranged.

Also in this case, what has been said previously for reading of optical information applies. The first face in which the radio-frequency coded information reading means 5 is located is the upper head face 6 or a side face 10 and at least one portion of the semispace in front of the second face is illuminated, which is the rear face 13, which is adjacent to the first face.

In a third operating mode, the operator directs the rear face 13 of the portable device 1 to an image to be acquired and commands, via the keyboard, 2, the acquisition. In this case, before the main controller 15 commands an acquisition according to the first operating mode disclosed above, the image to be acquired has to be illuminated beforehand to enable the managing means 17 of the camera 11 to set the parameters that are necessary for the acquisition.

In the third operating mode, which precedes the second, the main controller 15 commands the driving means 20, enabled by the enabling means 19 to power the illuminator 12 with the driving signal 21 that consists of a current line at the third direct current level, the value of which is equal, for example, to 350 mA to illuminate the second semispace only for the limited period of time in which the camera sets its parameters. If the camera establishes that the flash is not necessary, it does not enable the enabling means 19 to enable the driving means 20 and performs an image acquisition without flash.

Still according to the third operating mode, the operator commands an illuminating mode for illuminating the second semispace. In this case, the main controller 15 commands the driving means 20 for all the time required by the operator to power the illuminator 12 to the third current level. According to an alternative embodiment of the present invention, the visual indication of completed reading of an optical code is not provided by the illuminator 12 but only through the beam of light 7. The visual indication of completed reading by the illuminator 12 is dedicated to the reading of a radio-frequency coded piece of information, which would not otherwise have a dedicated visual indication.

According to a further alternative embodiment of the present invention, the image acquisition means 11, i.e. the commercial digital camera and the illuminator 12 associated therewith, can also be arranged on the front face 4 of the portable device 1 and not only on the rear face 13 thereof. The radio-frequency or optical code coded information reading means 5, is arranged in an upper head face 6 and/or lower head face 14 and/or lateral head face 10 of the portable device 1 and it should be noted that also in this case it is advantageous for the indication of completed reading to be in at least one portion of the semispace in front of the front face 4 of the device 1, which is different from the face in which the coded information reading means 5 is arranged.

What is claimed is:

1. A portable device comprising: coded information reading means and further comprising digital image acquisition means and an illuminator, said illuminator being associated with said digital acquisition means for acquiring at least a digital image of a framed zone and being powerable by a current driving signal corresponding to a first current signal in a first operating mode of said device for illuminating at least one image to be acquired and to a second current signal in a second operating mode for emitting a visual reading outcome indication relating to the reading of said coded information read by said coded information reading means,
    wherein said reading means is arranged at least partially on a first face of said portable device for reading said coded information arranged in a first semispace in front of said first face and said image acquisition means and said illuminator are arranged on a second face of said portable device, and
    wherein said illuminator illuminates at least a portion of a second semispace in front of said second face, said second face being different from said first face to orient differently in space said first semispace with respect to said second semispace.

2. The device according to claim 1, wherein said illuminator is powerable by said driving signal corresponding to a third current signal in a third operating mode, for illuminating a space in front of said illuminator.

3. The device according to claim 2, and comprising driving means for powering said illuminator by said driving signal corresponding to said first current signal, second current signal and third current signal, respectively, in said first operating mode, second operating mode and third operating mode of said device.

4. The device according to claim 3, wherein said illuminator comprises a microcircuit for emitting light of a single colour, said microcircuit being powerable by a single current line of said driving signal to a first current level in said first operating mode, to a second current level in said second operating mode and to a third current level in said third operating mode.

5. The device according to claim 4, wherein said illuminator is powerable to said first current level by a single pulse, said first current level being greater than said second and said third current levels, for illuminating said image during said acquisition.

6. The device according to claim 4, wherein said illuminator is powerable to said second current level by an alternating signal, said second current level being less than said first current level and than said third current level, to obtain an intermittent light as a reading outcome indication.

7. The device according to claim 3, wherein said illuminator comprises at least a first and a second microcircuit for emitting light of different colours, each microcircuit being powerable by a respective current line of said driving signal, each current line being powerable to a respective first current level in said first operating mode, to a respective second current level in said second operating mode and to a respective third current level in said third operating mode.

8. The device according to claim 7, wherein said illuminator is powerable for emitting light of a first colour at said first operating mode and for emitting light of a second colour at said second operating mode.

9. The device according to claim 1, wherein said illuminator emits in said second semispace said reading outcome indication of said coded information read by said coded information reading means in said first semispace.

10. The device according to claim 9, wherein said second face is opposite said first face and said illuminator illuminates at least one portion of said second semispace opposite said first semispace.

11. The device according to claim 10, wherein said first face is a front face of said portable device and wherein said reading means comprises radio-frequency reading means comprising a radio-frequency transmission and/or reception antenna arranged on said front face, substantially along at least one perimeter portion of an information display device intended for an operator.

12. The device according to claim 10, wherein said second face is a rear face of said portable device.

13. The device according to claim 1, wherein said second face is adjacent to said first face.

14. The device according to claim 13, wherein said first face is an upper head face and/or one of the side faces and/or a lower head face of said portable device and wherein said reading means comprises radio-frequency reading means and/or optical code reading means arranged on said first face, said radio-frequency reading means comprising a radio-frequency transmission and/or reception antenna.

15. The device according to claim 14, wherein said radio-frequency transmission and/or reception antenna and said reading means of said optical code are arranged on said upper head face, substantially along at least one perimeter portion of a frame comprising the reading means of said optical code.

16. The device according to claim 13, wherein said second face is a front face or a rear face of said portable device.

17. A method for reading coded information and for acquiring digital images by means of a portable device, said method comprising the steps of:
- reading by reading means said coded information, and/or acquiring by digital image acquisition means at least one digital image of a framed zone;
- associating with said digital image acquisition means an illuminator and powering said illuminator by means of a current driving signal corresponding to a first current signal in a first operating mode for illuminating said image during an acquisition;
- powering said illuminator by said driving signal corresponding to a second current signal in a second operating mode, such that said illuminator emits a visual reading outcome indication relating to the reading of said coded information when said coded information is read by said reading means,
wherein said method further comprises:
- arranging said reading means in a first face of said portable device to read coded information in a first semispace in front of said first face, and
- arranging said image acquisition means and said illuminator in a second face of said portable device such that said illuminator illuminates at least a portion of a second semispace in front of said second face, said second face being different from said first face to orient differently in space said first semispace said second semispace.

18. The method according to claim 17, and comprising powering said illuminator by said driving signal corresponding to a third current signal in a third operating mode of said device for illuminating a space in front of said illuminator.

19. The method according to claim 18, and comprising providing said illuminator of a microcircuit for emitting light of a single colour and powering said microcircuit by means of a current line of said driving signal to a first current level in said first operating mode, to a second current level in said second operating mode and to a third current level in said third operating mode.

20. The method according to claim 19, wherein said powering in said first operating mode comprises powering by means of a single pulse of said first current level, said first current level being greater than said second and said third current levels for illuminating said image during said acquisition.

21. The method according to claim 19, wherein said powering in said second operating mode comprises powering with an alternating signal of said second current level, said second current level being less than said first current level and of said third current level, to obtain an intermittent light as a reading outcome indication.

22. The method according to claim 17, wherein said illuminator includes at least two microcircuits for emitting light of different colours, the method comprising powering each microcircuit by means of a respective current line of said driving signal, each current line being powered at a respective first current level in said first operating mode, second current level in said second operating mode and third current level in said third operating mode.

23. The method according to claim 22 and comprising arranging said illuminator for emitting light of a first colour at said first operating mode and for emitting light of a second colour at said second operating mode.

24. The method according to claim 17, wherein said second face is opposite said first face, and comprising emitting said reading outcome indication of said coded information in said second semispace, opposite said first semispace wherein said coded information is read.

25. The method according to claim 17, wherein said second face is adjacent to said first face, and comprising emitting said reading outcome indication of said coded information in said second semispace in front of said second face.

* * * * *